(12) United States Patent  
Yap et al.

(10) Patent No.: US 9,153,282 B1  
(45) Date of Patent: Oct. 6, 2015

(54) DISC CLAMP ASSEMBLY WITH INTERLOCKING SHIMS

(71) Applicant: Seagate Technology LLC, Cupertino, CA (US)

(72) Inventors: PowMing Yap, Singapore (SG); KokLiang Cho, Melaka (MY); Aileen Woon, Singapore (SG); Hao Sun, Singapore (SG); Noppavit Yongrattana, Samut Prakarn (TH); Ying Su, Singapore (SG); CheeXian Lee, Singapore (SG); JunLong Lim, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/702,348

(22) Filed: May 1, 2015

(51) Int. Cl.  
   *G11B 17/02* (2006.01)
(52) U.S. Cl.  
   CPC ...................................... *G11B 17/02* (2013.01)
(58) Field of Classification Search  
   CPC ...... G11B 17/02; G11B 17/022; G11B 33/14; G11B 17/08  
   USPC ....................................................... 360/99.12  
   See application file for complete search history.

(56) References Cited

U.S. PATENT DOCUMENTS

| | | | |
|---|---|---|---|
| 5,731,928 A | 3/1998 | Jabbari et al. | |
| 5,790,345 A | 8/1998 | Alt | |
| 5,940,244 A | 8/1999 | Canlas et al. | |
| 6,212,031 B1* | 4/2001 | Kazmierczak et al. | 360/98.08 |
| 6,624,968 B1 | 9/2003 | Chessman et al. | |
| 6,757,132 B1* | 6/2004 | Watson et al. | 360/99.12 |
| 6,778,353 B1* | 8/2004 | Harper | 360/99.08 |
| 6,816,338 B1 | 11/2004 | Suwito | |
| 6,967,814 B1 | 11/2005 | Chessman et al. | |
| 7,099,109 B2* | 8/2006 | Kang et al. | 360/97.15 |
| 7,561,377 B2 | 7/2009 | Hayakawa et al. | |
| 7,589,935 B2 | 9/2009 | Kim | |
| 7,663,837 B2* | 2/2010 | Lim et al. | 360/99.12 |
| 8,693,139 B2 | 4/2014 | Tian et al. | |
| 8,693,140 B1 | 4/2014 | Weiher et al. | |
| 8,824,098 B1 | 9/2014 | Huang et al. | |
| 2004/0032691 A1* | 2/2004 | Drake et al. | 360/99.12 |
| 2007/0035876 A1* | 2/2007 | Engesser et al. | 360/99.12 |
| 2008/0019039 A1* | 1/2008 | Ng et al. | 360/99.12 |

* cited by examiner

*Primary Examiner* — Allen T Cao  
(74) *Attorney, Agent, or Firm* — Hall Estill Attorneys at Law

(57) ABSTRACT

Method and apparatus for securing a disc stack to a spindle motor hub. In some embodiments, a disc clamp assembly includes a spring clamp with an annular contact portion which contactingly engages a disc stack and a central aperture through which a hub projection of the spindle motor hub extends. A plurality of interlocking semi-annular shim segments interlock together to form a continuous retention ring assembly which wedges between the spring clamp and a shoulder surface of the spindle motor hub.

20 Claims, 6 Drawing Sheets

US 9,153,282 B1

DISC CLAMP ASSEMBLY WITH INTERLOCKING SHIMS

SUMMARY

Various embodiments of the present disclosure are generally directed to a method and apparatus for securing a disc stack to a spindle motor hub.

In some embodiments, a disc clamp assembly includes a spring clamp with an annular contact portion which contactingly engages a disc stack and a central aperture through which a hub projection of the spindle motor hub extends. A plurality of interlocking semi-annular shim segments interlock together to form a continuous retention ring assembly which wedges between the spring clamp and a shoulder surface of the spindle motor hub.

In other embodiments, an apparatus includes a rotatable spindle motor hub having an outer cylindrical surface, a top annular surface and a hub projection extending from the top annular surface. A disc stack is arranged about the outer cylindrical surface. A disc clamp assembly secures the disc stack to the hub. The disc clamp assembly includes a spring clamp with an outermost portion having an annular contact surface that bears against the disc stack, and an innermost portion with a central aperture through which the hub projection extends. The disc clamp assembly further has a plurality of nominally identical shim segments which interlock to form a retention ring assembly that is contactingly wedged between the innermost portion of the disc clamp assembly and the hub projection.

In still further embodiments, a method includes placing a spring clamp with a central aperture onto a disc stack so that a projection hub of a spindle motor hub supporting the disc stack extends through the central aperture; applying a bias force upon the spring clamp to deflect the spring clamp toward the hub; lowering a first shim segment toward the spring clamp; laterally translating the first shim segment into a groove in the projection hub to interlock with a second shim segment nominally identical to the first shim segment; and reducing the bias force to enable the spring clamp to press the first shim segment against a recessed shoulder surface of the groove.

DETAILED DESCRIPTION

Figure 1:
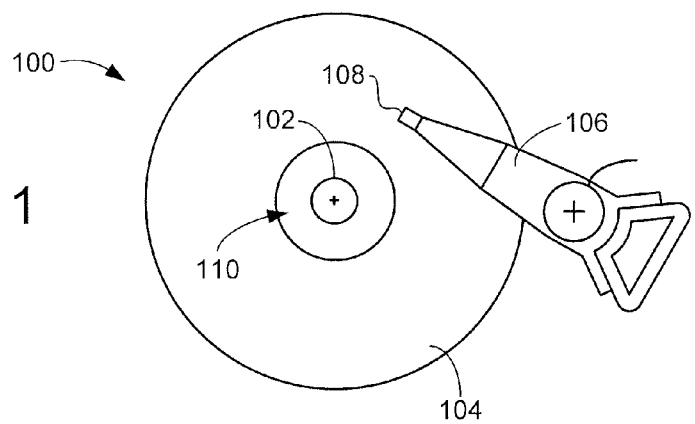
FIG. 1 is a schematic representation of a data storage device constructed in accordance with some embodiments of the present disclosure.

Some data storage devices such as hard disc drives (HDDs) incorporate one or more data recording media (discs) which are mounted to a hub of a spindle motor and rotated at a constant high speed. An array of moveable data transducers (heads) write data to and read data from tracks defined on the rotating disc surfaces. The transducers may be hydrodynamically supported in close proximity to the disc surfaces by fluidic currents (e.g., air) established by high speed rotation of the discs.

A clamp assembly often used to rigidly secure the discs to the spindle motor hub. One well known form of clamp assembly uses a spring clamp and a unitary retention ring. To install the clamp assembly, the spring clamp is placed onto the hub to contact a disc stack. The retention ring is forced open, lowered onto the hub to deflect the spring clamp, and allowed to resume its original shape to secure the spring clamp to the hub in its deflected state.

Another well known form of clamp assembly uses one or more threaded fasteners (e.g., screws) to attach a clamp member to a disc stack. The clamp member is lowered onto the disc stack, and the fasteners are sequentially engaged through the clamp member and into the hub. By tightening the fasteners, the clamp member is deformed to exert a clamping force onto the disc stack.

While operable, there are a number of limitations associated with these and other disc clamp solutions. As successive generations of data storage devices continue to be provided with smaller and thinner form factors, the available clearance to accommodate a disc clamp assembly is reduced, which increases the difficulty in establishing adequate clamp force upon the discs. Existing clamp solutions can also be relatively difficult to install and require several carefully controlled processing steps, which can be challenging in a high volume manufacturing environment.

Existing clamp solutions also often result in the generation of particulate contamination through the metal-on-metal engagement required during clamp installation. Such contamination can migrate to the disc surfaces and degrade the operational performance of the storage device by interfering with the interface between the transducers and the recording surfaces. As successive generations of storage devices provide ever higher track densities and lower transducer clearance distances (fly heights), mitigating the generation of contaminant particulates becomes an increasingly greater concern.

Accordingly, various embodiments of the present disclosure provide a disc clamp assembly to secure an axially aligned stack of one or more rotatable magnetic recording media (a "disc stack") to a spindle motor hub. As explained below, a disc-shaped spring clamp has an annular contact portion adapted to contactingly engage a disc stack. A central aperture of the spring clamp is sized to facilitate passage of a hub projection of the spindle motor hub therethrough as the spring clamp is placed onto the spindle motor hub.

A retaining ring assembly is used to secure the spring clamp to the hub. The retaining ring assembly is formed of a plurality of interlocking semi-annular shim segments. The shim segments individually wedge between the disc spring clamp and a shoulder surface of the spindle motor hub, and lock together to form a substantially continuous retention ring.

In this way, the disc clamp assembly does not utilize screws or conventional retaining rings, provides a lower profile design over existing solutions, and eliminates sliding metal-to-metal contact which significantly reduces particle generation during installation. The configuration of the assembled retaining ring assembly as a substantially continuous annular web of material of consistent cross-sectional thickness reduces the introduction of imbalance to the disc stack, potentially reducing the need to apply counterbalance weights to correct imbalance in the completed assembly.

These and other features of various embodiments disclosed herein can be understood beginning with a review of FIG. 1 which shows representative aspects of a data storage device 100. The device 100 is characterized as a hard disc drive (HDD) and includes a spindle motor hub 102 that supports a disc stack of one or more magnetic recording media (discs) 104. A moveable actuator 106 pivots about a pivot axis to position an array of data read/write transducers (heads) 108 adjacent tracks defined on the recording surfaces of the discs. A disc clamp assembly, generally denoted at 110, secures the disc stack to the spindle motor hub 102 in a manner explained below.

Figure 2:
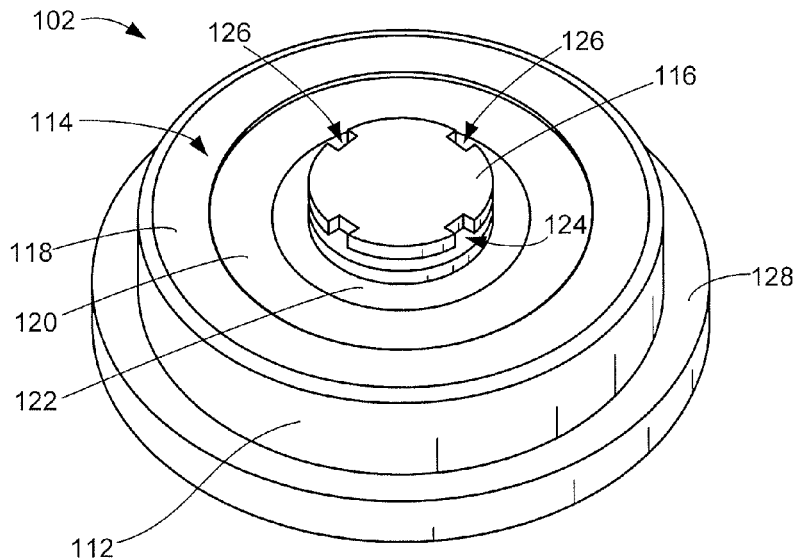
FIG. 2 is an enlarged perspective view of a spindle motor hub as commonly found in a device such as depicted in FIG. 1.
Figure 3:
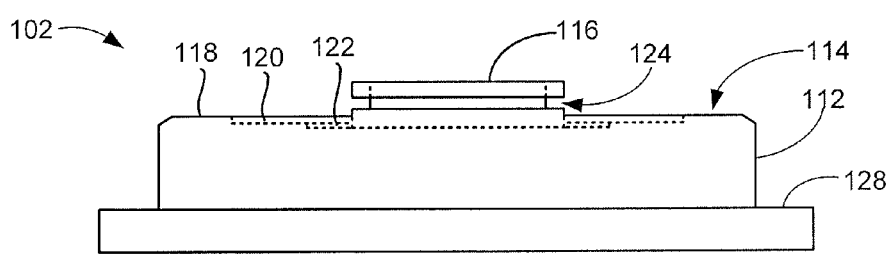
FIG. 3 is a side view of the spindle motor hub of FIG. 2.

FIGS. 2 and 3 show the spindle motor hub 102 from FIG. 1 in accordance with some embodiments. The hub 102 is substantially cylindrically shaped and forms a portion of a spindle motor used to rotate the discs 104 at a constant high speed during operation. The hub 102 includes an outer cylindrical wall 112, an annular top surface 114 and spindle hub projection 116.

The outer cylindrical wall 112 is sized to be closely spaced with the innermost diameters (IDs) of the discs 104 when the discs are installed onto the hub 102. The annular top surface 114 has a top outer surface 118, a medial recessed surface 120 and an inner recessed surface 122. The hub projection 116 has a groove 124 extending therein about its circumference, and a plurality of notch reliefs 126 communicating with the groove 124. The spindle motor hub 102 further has a disc support flange (shelf or shoulder surface) 128 to support the discs 104.

Figure 4:
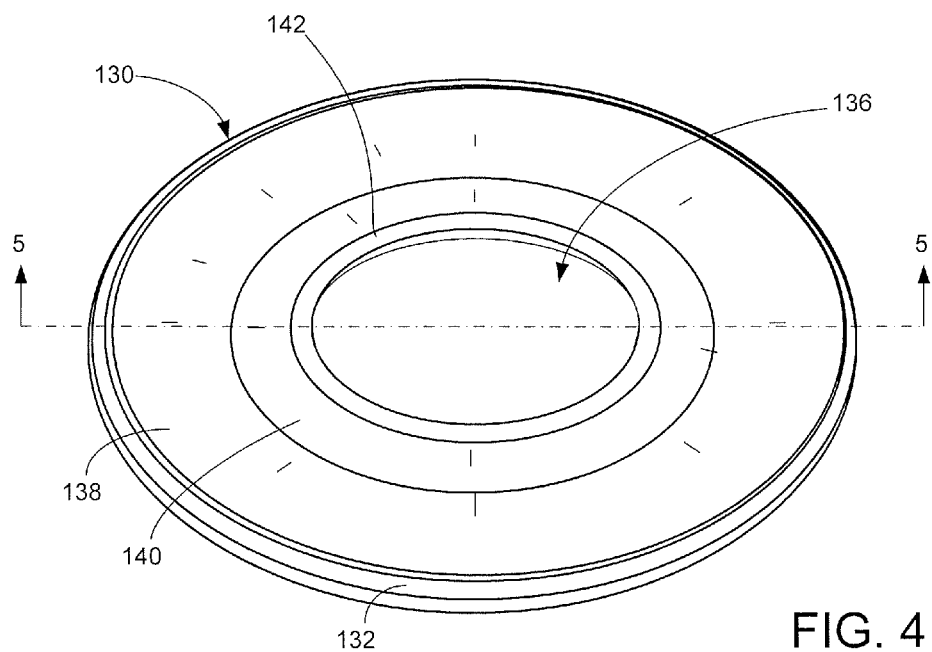
FIG. 4 is a perspective view of a spring clamp of a disc clamp assembly used to secure a disc stack to the spindle motor hub of FIGS. 2-3.
Figure 5:
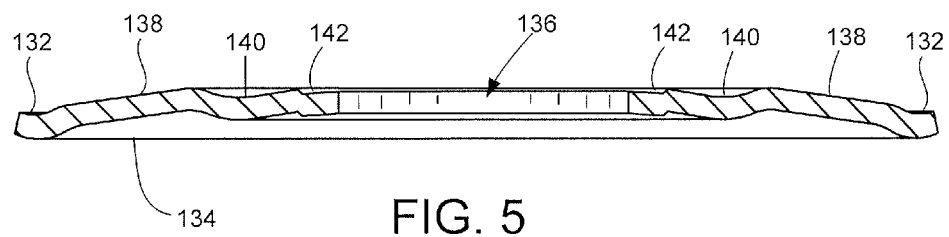
FIG. 5 is a view taken along section line 5-5 in FIG. 4.

Turning to FIG. 4, the disc clamp assembly 110 includes a disc clamp 130 formed of a suitable spring metal. The disc clamp 130, also referred to herein as a spring clamp, is shown to generally take a Belleville washer configuration, although other configurations can be used depending on the requirements of a given application. FIG. 5 provides a cross-section of the disc clamp 130 as generally viewed along line 5-5 in FIG. 4.

The disc clamp 130 has an outermost edge portion 132 with a circumferentially extending contact edge 134 sized to contactingly press against the topmost disc 104 in the disc stack when mounted to the hub 102. A central aperture 136 has a diameter sufficiently sized to fit over the hub projection 116 so that the hub projection extends through the central aperture as the disc clamp 130 is lowered onto the disc stack.

As further shown in FIG. 5, the disc clamp 130 includes an outer upwardly arching portion 138, a first depressed portion 140 and a second depressed portion 142. These portions provide the disc clamp 130 with a slightly concave configuration in a direction toward the disc stack when positioned on the hub 102.

Figure 6:
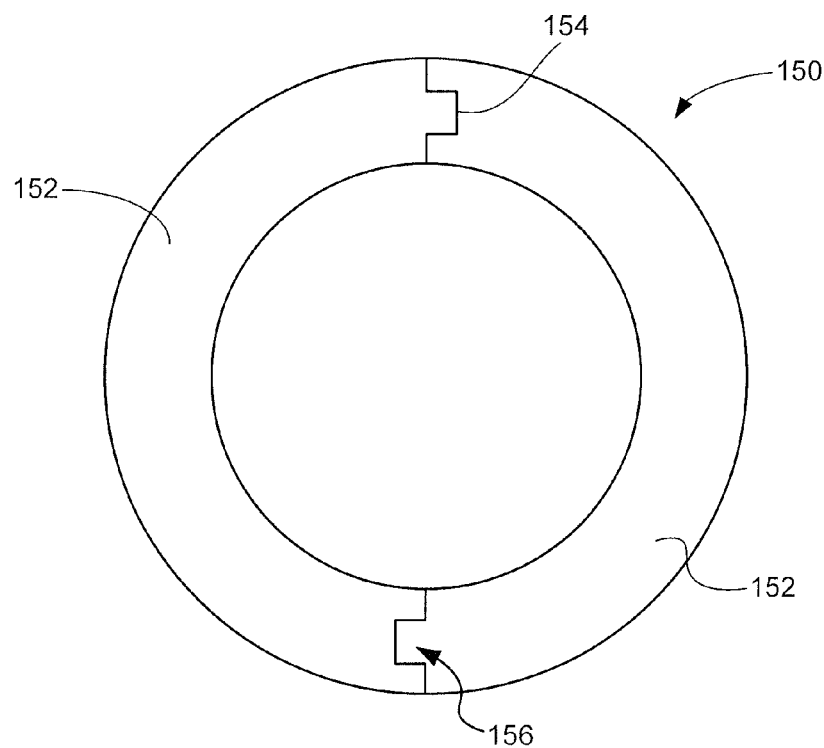
FIG. 6 is a retaining ring assembly of the disc clamp assembly.
Figure 7:
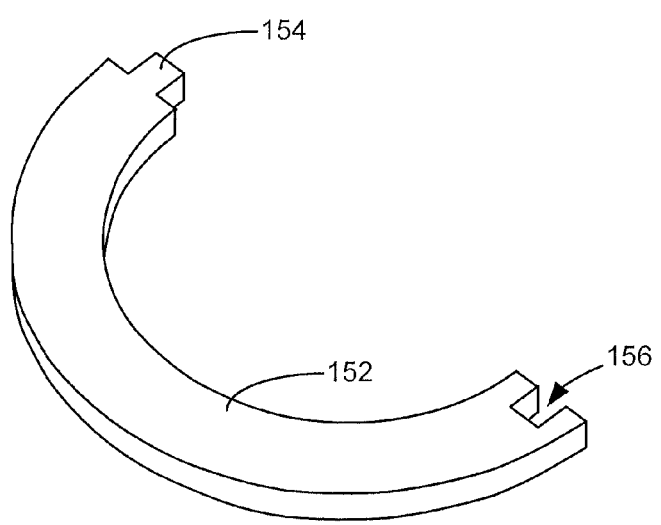
FIG. 7 shows one the shim segments that make up the retaining ring assembly of FIG. 6.

The disc clamp assembly 110 further includes a retaining ring assembly 150, as generally illustrated in FIG. 6. The retaining ring assembly 150 includes a plurality of interlocking shim segments 152. An isometric depiction of one of the shim segments 152 is shown in FIG. 7.

The shim segments 152 are flat, curved elements that annularly extend through a portion of the entire 360 degree circumferential extent of the retaining ring assembly 150. When two (2) shim segments 152 are used as shown in FIG. 6, each shim segment extends nominally 180 degrees. Other numbers of shims can be used, such as three (3) shim segments of 120 degrees each, four (4) shim segments of 90 degrees each, etc.

Each shim segment 152 has a tongue 154 at one end and a groove 156 at its other end, thereby forming a tongue-and-groove arrangement whereby the two shim segments 152 can be locked together to form the complete retaining ring assembly 150. It will be noted that each shim segment 152 is inverted with respect to the other one, so that each tongue 154 interlocks in a corresponding groove 156. Other interlocking arrangements can be used. While the shims are contemplated as being the same size and nominally identical, shims of different size (e.g., shims with different circumferential extents, thicknesses, widths, etc.) can be used to interlock into the continuous retention ring assembly as desired.

Figure 8A:
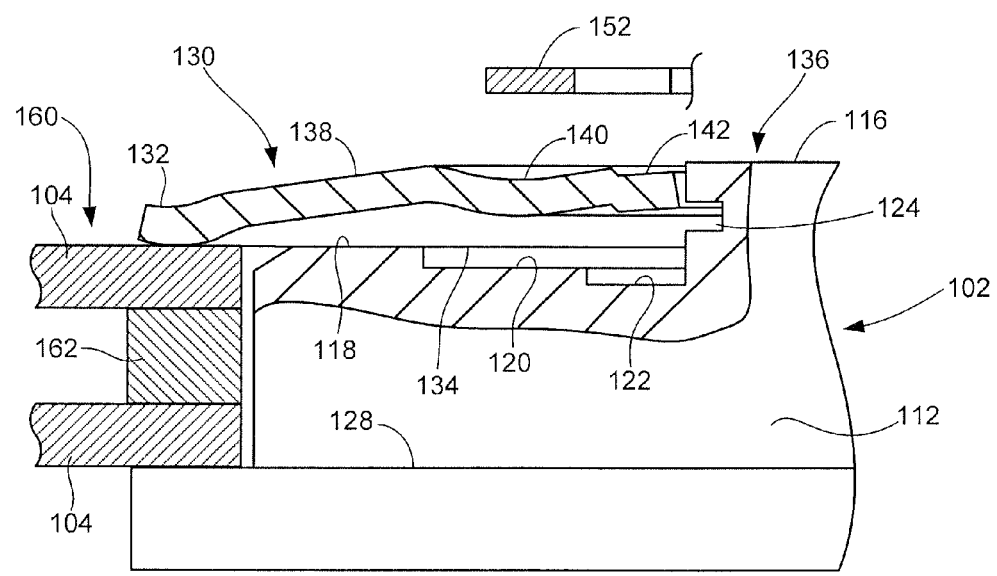
FIG. 8A through 8C are partial cutaway views depicting progressive steps of installing the disc clamp assembly onto the spindle motor hub of FIGS. 2-3.
Figure 8B:
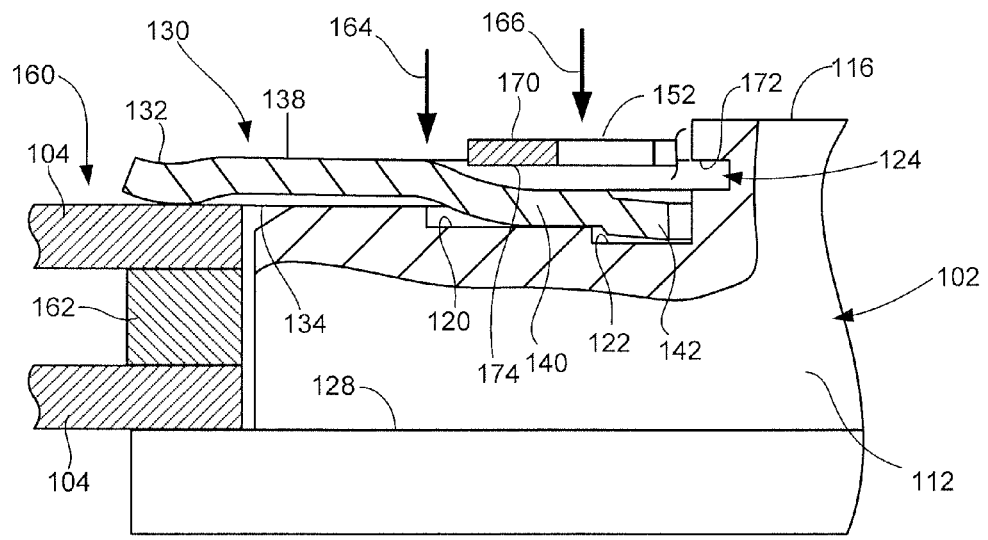
Figure 8C:
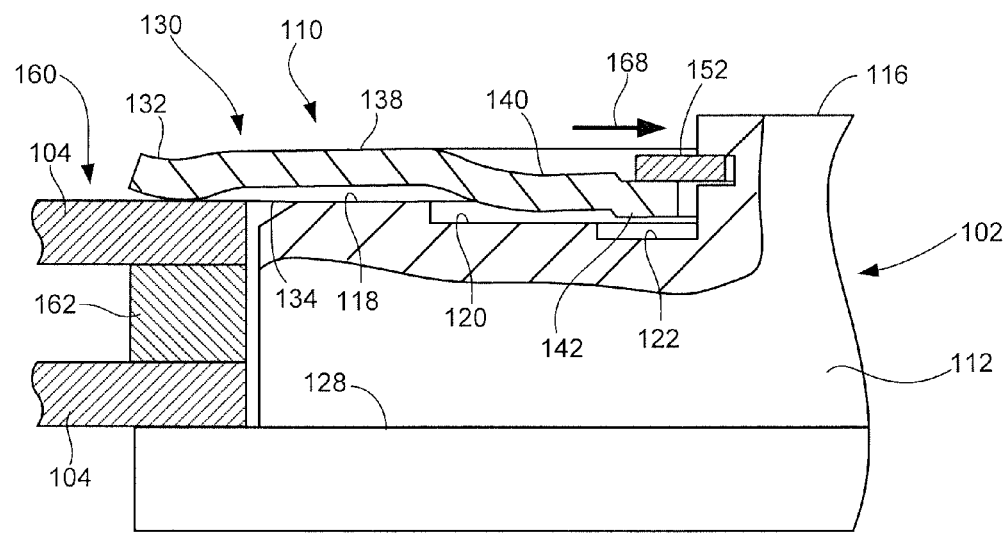

FIGS. 8A through 8C show a progression of steps through which the disc clamp assembly 110 can be installed to secure a disc stack 160 onto a spindle motor hub 102. The disc stack 160 is formed from two discs 104 and an intervening spacer 162. Other disc stack arrangements can be used including a disc stack that includes only a single disc. While the top elevational height of the disc stack 160 is shown to be nominally aligned with the outer top surface 118 of the hub 102, such is merely exemplary and is not limiting. In other embodiments, the top surface of the disc stack 160 may be higher or lower than surface 118.

FIG. 8A shows the disc clamp 130 positioned onto the hub 102. The annular contact edge 134 of the disc clamp 130 (see FIG. 5) contactingly engages the topmost disc 104 of the disc stack 160, and the hub projection 116 extends through, and in non-contacting relation with, the central aperture 136 of the disc clamp 130 (see FIG. 4). In this position, the disc clamp 130 rests in a nominally centered relation upon the disc stack 160 and exerts no spring bias forces thereon. A shim segment 152 is positioned above the disc clamp 130 in preparation for installation onto the disc clamp.

As shown in FIG. 8B, a downward deflection force, generally represented by arrow 164, is applied to the disc clamp 130 to deform the disc clamp in a direction toward the hub 102. In this deformed state, the first and second depressed portions 140, 142 of the disc clamp 130 are flexed downwardly toward the upper surface 114 of the hub 102 (see FIG. 3). In this position, the first portion 140 of the disc clamp 130 is nested within the recess formed by recessed surface 120, and the second portion 142 of the disc clamp 130 is nested within the recess formed by recessed surface 122.

While not limiting, a selected one of the first and/or second depressed portions 140, 142 may contactingly engage the corresponding recessed surfaces 120, 122 during the deflection of the disc clamp 130, such as shown for portion 140 and recessed surface 120 in FIG. 8B. During continued application of the deflection force 164, the shim segment 152 is lowered toward the disc clamp 130 as indicated by arrow 166.

The deflection force 164 can be induced by contacting any suitable exposed portion of the disc clamp 130 that does not mechanically interfere with the travel path of the shim segment(s) 152. A pad of elastomer or other nonparticulating material can be used to contact the disc clamp 130 and exert the deflection force to reduce the generation of particulates from the pad and from the disc clamp.

Continuing with FIG. 8B, the respective recessed surfaces 120, 122 in the hub 102 and the portions 140, 142 of the disc clamp 130 are sized such that, at maximum deflection, a clearing relation is formed for the annular groove 124 in the hub projection. This allows the shim segment 152 to be lowered and translated into the groove 124, as generally represented by arrow 168 in FIG. 8C.

With reference again to FIG. 8B, a suitable end effector or other mechanism advances the shim segment 152 so that an upper surface 170 of the shim segment is lower in elevation than an upper shoulder surface 172 of the hub projection 116. While not necessarily limiting, at this position an opposing lower surface 174 of the shim segment 152 is in a non-contacting relation to the disc clamp 130.

This allows the shim segment 152 to be inserted into the groove 124 without touching any other surfaces of the system. Once the shim segment 152 is positioned in the groove 124, the deflection force 164 can be gently reduced to allow the spring clamp 130 to move upwardly, bringing the upper surface of portion 142 into contact with lower surface 174 of the shim segment 152. Further gradual reduction of the deflection force 164 causes the portion 142 of the spring clamp 130 to advance the shim segment 152 up slightly until upper surface 170 of the shim segment 152 comes into contacting, pressing engagement against the shoulder surface 172.

The shim segment 152 wedges the disc clamp 130 in place against the spindle motor hub 102 and the disc stack 160 to retain the disc stack using the bias force exerted by the disc clamp 130 in its deflected state. Substantially no scraping or other sliding contact is encountered; instead, the shim segment is pressed into place by the disc clamp, which reduces or eliminates the potential for particulate generation as the respective surfaces 170, 172 come into mutual contact.

While not limiting, FIG. 8C shows portion 138 of the disc clamp 130 is nominally parallel to top surface 118, portion 140 of the disc clamp 130 is nominally parallel to recessed surface 120, and portion 142 of the disc clamp 130 is nominally parallel to recessed surface 122. Other final orientations can be used.

The shim segments 152 can be installed concurrently or sequentially. In one embodiment the sequence of FIGS. 8A-8C is carried out on all sides of the spindle motor hub 102 so that all of the shim segments 152 are installed at the same time. In another embodiment, the sequence of FIGS. 8A-8C is carried out sequentially on different sides of the hub as each shim segment 152 is installed in turn.

Figure 9:
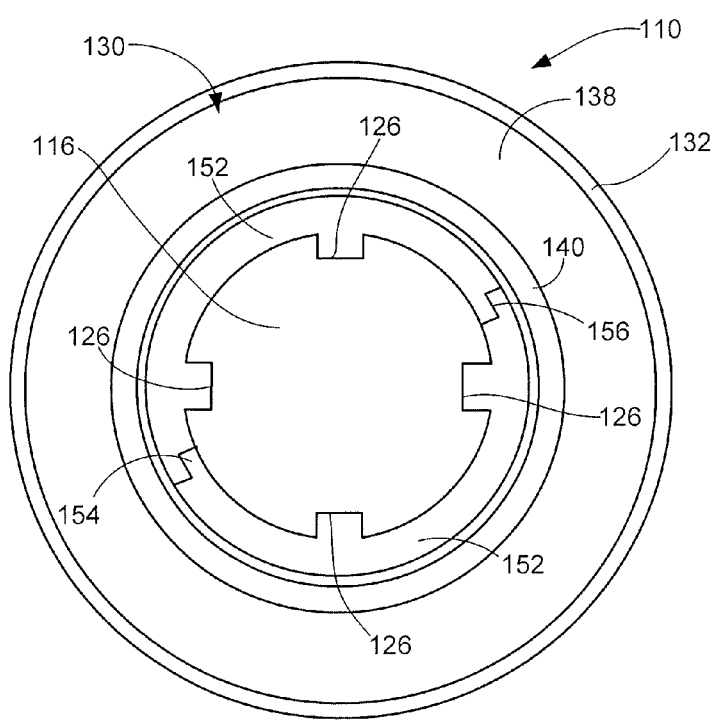
FIG. 9 is a plan view showing the disc clamp assembly installed on the hub.

Regardless, as each shim segment 152 is installed, the shim segment interlocks with the immediately adjacent shim segment(s) to form the completed retaining ring assembly 150 (FIG. 4), as represented in FIG. 9. The grooves 126 in the hub projection 116 provide clearance for manipulation of the shim segments (as required) as well as provide visual confirmation of the correct final placement of the shim segments. The shim segments 152 can be aligned as required with respect to the grooves 126.

Removal of the disc clamp assembly 110 can be easily carried out in accordance with the foregoing steps. A deflection force such as 164 is applied to deflect the disc clamp 130 to the position in FIG. 8B; the shim segments 152 are removed by laterally translating the shim segments out of the groove 124 in a direction opposite that of arrow 168 (FIG. 8C); and the deflection force 164 is removed to return the disc clamp 130 to the initial position of FIG. 8A. The undeflected disc clamp 130 can thereafter be removed from the hub 102 and the disc stack 160 can be accessed.

Figure 10:
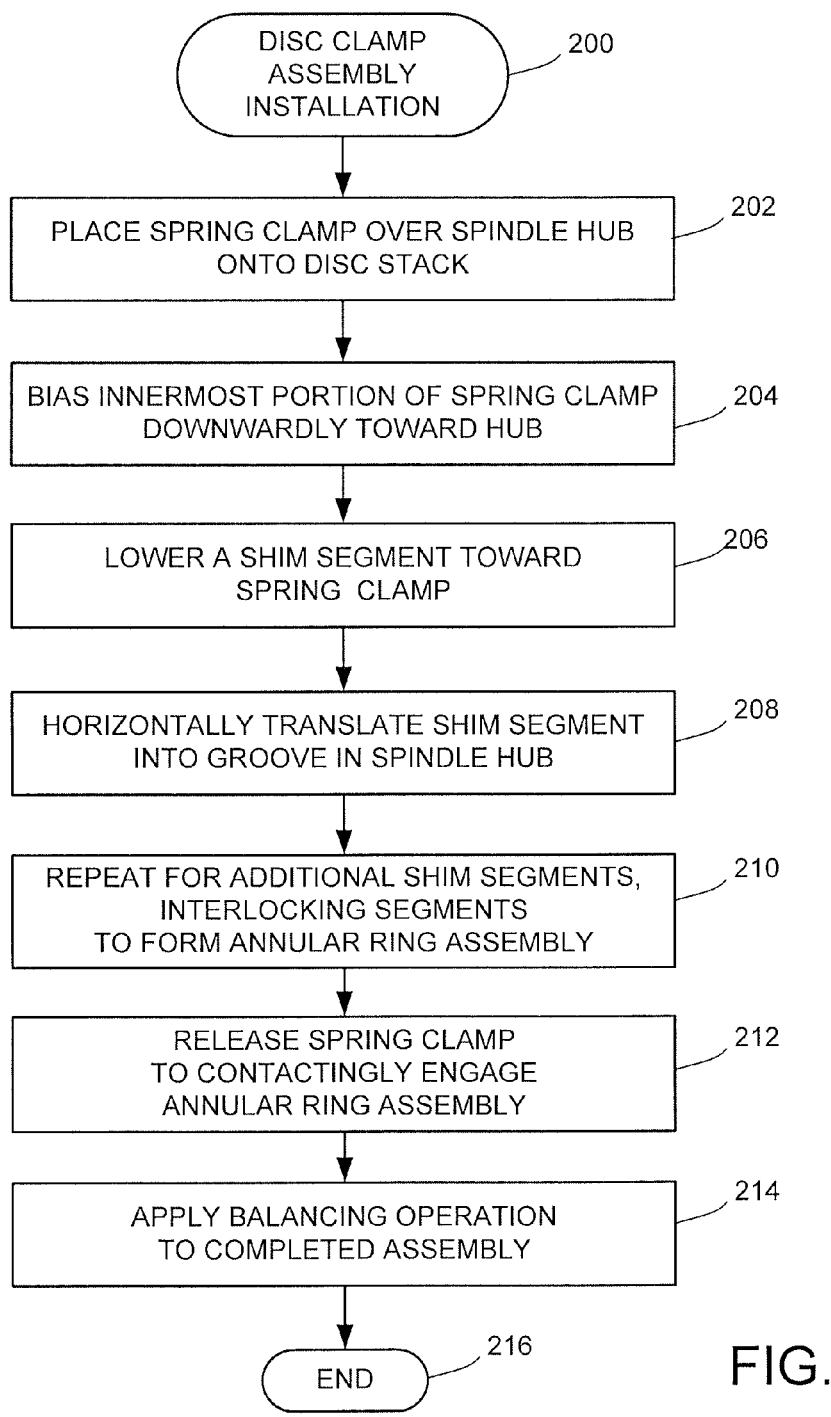
FIG. 10 is a flow chart for a disc clamp assembly installation routine illustrative of steps carried out in accordance with some embodiments of the present disclosure.

FIG. 10 provides a flow chart for a disc clamp assembly installation routine 200 useful to secure a disc stack such as depicted at 160 to a spindle motor hub such as 102.

The routine begins with a first step 202 of placing a disc spring clamp such as 130 over a hub projection such as 116 of the spindle hub 102 and onto the disc stack 160; the next step 204 biases the innermost portion of the disc spring clamp toward the uppermost disc on the disc stack.

In step 206, at least one of the shim segments of the retaining ring assembly is lowered toward the disc spring clamp. At step 208, the shim segment is translated into a groove such as 124 in the spindle hub. In step 210, one or more additional shim segments are lowered and translated into the groove, interlocking the shim segments together to form the completed retaining ring assembly.

Next, in step 212 the spring disc clamp is released so that it contactingly engages the retaining ring assembly whereby the disc stack is firmly secured. Following this, step 214 calls for subjecting the disc drive with the completed assembly to a balancing operation as required to add one or more balance weights to correct imbalance. The routine then ends at step 216.

It will now be appreciated that the disc clamp assembly as embodied herein requires no screws or other fasteners such as snap rings. The installation process involves minimal mechanical contacting of components, eliminating or minimizing the generation of particulate contamination during installation and removal. The contact that does occur is substantially limited to pressing contact as the disc clamp is deflected and released to bring the shim segments into axial pressing contact with the shoulder surface of the hub. The interlocking shim segments serve to ensure proper alignment and placement of the retaining ring assembly, and the location of the clamp assembly provides a lower profile design that accommodates thinner storage device designs.

Other various features and alternative details of construction of the embodiments described herein will readily occur to the skilled artisan in view of the foregoing discussion, and such alternatives are encompassed in the following claims. It will be understood that even though numerous characteristics and advantages of various embodiments of the present disclosure have been set forth in the foregoing description, together with details of the structure and function of the various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A disc clamp assembly comprising:
    a spring clamp comprising an annular contact portion adapted to contactingly engage a disc stack and a central aperture adapted to facilitate passage of a hub projection of a spindle motor hub therethrough; and
    a plurality of interlocking semi-annular shim segments adapted to interlock together to form a continuous retention ring assembly, the retention ring assembly adapted to wedge between the spring clamp and a shoulder surface of the spindle motor hub.

2. The disc clamp assembly of claim 1, wherein the spring clamp is formed of a spring metal having a Belleville washer configuration.

3. The disc clamp assembly of claim 1, wherein the spring clamp has an outer circumferentially extending contact edge sized to engage the disc stack when mounted to the spindle motor hub.

4. The disc clamp assembly of claim 1, wherein the spindle motor hub is cylindrically shaped and has an upper surface comprising a top outer surface, a medial depressed surface and an inner depressed surface.

5. The disc clamp assembly of claim 1, wherein the shoulder surface forms a circumferentially extending groove in the hub projection, and the shim segments extend into the circumferentially extending groove.

6. The disc clamp assembly of claim 1, wherein the spindle motor hub has a recessed shoulder surface against which the spring clamp presses the shim segments.

7. The disc clamp assembly of claim 1, wherein each of the shim segments has a tongue at a first end and a groove at an opposing second end, the shim segments locking together in a tongue-and-groove arrangement to form the retaining ring assembly.

8. The disc clamp assembly of claim 1, wherein the plurality of shim segments is a pair of shim segments, each shim segment nominally identical to the other and being a flat, curved member extending through nominally 180 degrees.

9. An apparatus comprising:
 a rotatable spindle motor hub having an outer cylindrical surface, a top annular surface and a hub projection extending from the top annular surface;
 a disc stack arranged about the outer cylindrical surface; and
 a disc clamp assembly which secures the disc stack to the hub comprising a spring clamp comprising an outermost portion with an annular contact surface that bears against the disc stack and an innermost portion with a central aperture through which the hub projection extends, the disc clamp assembly further comprising a plurality of nominally identical shim segments which interlock to form a retention ring assembly contactingly wedged between the innermost portion of the disc clamp assembly and the hub projection.

10. The apparatus of claim 9, wherein the disc clamp assembly is installed onto the hub by placing the annular contact surface onto the disc stack, applying a deflection force to advance the innermost portion of the spring clamp toward the top annular surface, laterally translating the interlocking shims from opposing directions into an annular groove in the hub projection in non-contacting relation to the hub and the spring clamp, and removing the deflection force from the spring clamp.

11. The apparatus of claim 9, wherein the spring clamp has a Belleville washer configuration.

12. The apparatus of claim 9, wherein the top annular surface comprises at least one annular recessed surface that provides a clearance gap into which a depressed portion of the spring clamp extends.

13. The apparatus of claim 9, wherein the spindle motor hub has a cylindrically shaped outer surface and an annular upper surface comprising a top outer surface adjacent the cylindrically shaped outer surface, a medial recessed surface extending a first recessed distance from the top outer surface, and an inner recessed surface adjacent the hub projection extending a greater, second recessed distance from the top outer surface.

14. The apparatus of claim 13, wherein the spring clamp has a first portion that extends adjacent in noncontacting relation to the top outer surface, a second portion that extends adjacent in non-contacting relation to the medial recessed surface below the top outer surface, and a third portion that extends adjacent in non-contacting relation to the inner recessed surface below the top outer surface.

15. The apparatus of claim 9, wherein the spindle motor hub has a recessed shoulder surface against which the spring clamp presses the shim segments.

16. The apparatus of claim 9, wherein each of the plurality of nominally identical shim segments has a tongue at a first end and a groove at an opposing second end, the shim segments locking together in a tongue-and-groove arrangement to form the retention ring assembly.

17. The apparatus of claim 16, wherein the plurality of nominally identical shim segments is a pair of shim segments each being a flat, curved member extending through nominally 180 degrees.

18. The apparatus of claim 9, the disc stack comprising at least one magnetic recording disc and at least one disc spacer.

19. A method comprising:
 placing a spring clamp with a central aperture onto a disc stack so that a projection hub of a spindle motor hub supporting the disc stack extends through the central aperture;
 applying a bias force upon the spring clamp to deflect the spring clamp toward the hub;
 lowering a first shim segment toward the spring clamp;
 laterally translating the first shim segment into a groove in the projection hub to interlock with a second shim segment nominally identical to the first shim segment; and
 reducing the bias force to enable the spring clamp to press the first shim segment against a recessed shoulder surface of the groove.

20. The method of claim 19, further comprising lowering the second shim segment toward the spring clamp, wherein the reducing step further enables the deflected spring clamp to concurrently press the second shim segment against the recessed shoulder surface of the groove.

* * * * *